US010785510B2

(12) United States Patent
Koul et al.

(10) Patent No.: US 10,785,510 B2
(45) Date of Patent: *Sep. 22, 2020

(54) AUTOMATIC RECOGNITION OF ENTITIES IN MEDIA-CAPTURED EVENTS

(71) Applicant: Microsoft Technology Licensing, LLC, Redmond, WA (US)

(72) Inventors: Anirudh Koul, Sunnyvale, CA (US); Serge-Eric Tremblay, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,356

(22) Filed: Nov. 6, 2018

(65) Prior Publication Data

US 2019/0075341 A1    Mar. 7, 2019

Related U.S. Application Data

(63) Continuation of application No. 15/491,614, filed on Apr. 19, 2017, now Pat. No. 10,165,307, which is a
(Continued)

(51) Int. Cl.
*H04N 21/234* (2011.01)
*G06K 9/00* (2006.01)
(Continued)

(52) U.S. Cl.
CPC ......... *H04N 21/23424* (2013.01); *G06K 9/00* (2013.01); *G06K 9/00221* (2013.01);
(Continued)

(58) Field of Classification Search
CPC ........... G06K 9/00771; G06K 9/00805; G06K 9/3241; G06K 9/00832; G06K 9/00362;
(Continued)

(56) References Cited

U.S. PATENT DOCUMENTS 6,502,082 B1 * 12/2002 Toyama ............. G06K 9/00234
706/15
7,319,779 B1 * 1/2008 Mummareddy ... G06K 9/00288
382/118
(Continued)

FOREIGN PATENT DOCUMENTS

CN    102857810 A    1/2013
CN    103873945 A    6/2014

OTHER PUBLICATIONS

"Office Action Issued in Chinese Patent Application No. 201680035310.4", dated Oct. 8, 2019, 18 Pages.
(Continued)

*Primary Examiner* — Aklilu K Woldemariam

(57) ABSTRACT

Architecture that enables the identification of entities such as people and content in live broadcasts (e.g., streaming content (e.g., video) of live events) and non-live presentations (e.g., movies), in realtime, using recognition processes. This can be accomplished by extracting live data related to a live event. With respect to people entities, filtering can be performed to identify the named (people) entities from the extracted live data, and trending topics discovered as relate to the named entities, as associated with the live event. Multiple images of the named entities that capture the named entities under different conditions are captured for the named entities. The images are then processed to extract and learn facial features (train one or more models), and facial recognition is then performed on faces in the video using the trained model(s).

20 Claims, 7 Drawing Sheets

Related U.S. Application Data continuation of application No. 14/741,015, filed on Jun. 16, 2015, now Pat. No. 9,704,020.

(51) Int. Cl.

| | | |
|---|---|---|
| *H04N 21/2187* | (2011.01) |
| *H04N 21/8405* | (2011.01) |
| *G06K 9/32* | (2006.01) |
| *H04N 21/4722* | (2011.01) |
| *G06K 9/62* | (2006.01) |
| *H04N 21/44* | (2011.01) |
| *H04N 21/84* | (2011.01) |

(52) U.S. Cl.
CPC .......... *G06K 9/00711* (2013.01); *G06K 9/325* (2013.01); *G06K 9/6269* (2013.01); *H04N 21/2187* (2013.01); *H04N 21/23418* (2013.01); *H04N 21/44008* (2013.01); *H04N 21/4722* (2013.01); *H04N 21/84* (2013.01); *H04N 21/8405* (2013.01); *G06K 9/00288* (2013.01); *G06K 2009/00738* (2013.01)

(58) Field of Classification Search
CPC .......... G06K 9/00624; G06K 9/00751; G06K 9/00677; G06K 9/00724; G06K 2009/00738; G06K 2009/3291; G06K 9/6215; G06K 9/6296; G06K 9/00221; G06K 9/00711; G06K 9/6269; G09B 5/02; G09B 21/008; G09B 5/06; G09B 7/02; G09B 7/04; H04L 67/22; H04L 67/306; H04L 41/0869; H04L 67/2885; H04L 65/4084; H04L 2209/60; H04L 67/34; H04L 63/1416; H04L 65/4069; B60R 21/01552; B60R 2001/1253; G06F 17/30026; G06F 17/30047; G06F 17/30793; G06F 17/30256; G06F 17/30268; G06F 17/30277; G06F 17/3053; G06F 3/0304; G06F 17/30861; G06F 21/55; G06F 17/175; G06F 17/30038; G06F 17/30265; G06F 17/28; G06F 1/28; G06F 1/3212; G06F 17/278; G06F 17/2785; G06F 3/015; G06T 2207/10016; G06T 2207/30196; G06T 7/0075; G06T 7/2033; G06Q 50/01; G06Q 30/0201; G06Q 30/0242; G06Q 50/188; H04N 21/262; H04N 21/2743; H04N 21/8549; H04N 21/252; H04N 2005/91364; G01B 11/254; G11B 20/00115; G06N 3/08; G06N 3/02; G06N 99/005; G06N 5/04; G07C 5/085; A63F 2300/69

USPC .... 382/103, 118, 143, 190, 229; 706/15, 16, 706/20, 23, 24; 709/204, 224
See application file for complete search history.

(56) References Cited

U.S. PATENT DOCUMENTS

| | | | | |
|---|---|---|---|---|
| 8,649,613 | B1* | 2/2014 | Leung .............. | G06K 9/00724 382/155 |
| 8,923,607 | B1* | 12/2014 | Kwatra .............. | G06K 9/00724 382/159 |
| 2002/0103668 | A1* | 8/2002 | Ecklund .............. | G06Q 10/063 455/437 |
| 2003/0078897 | A1* | 4/2003 | Florance .............. | G06Q 40/04 705/80 |
| 2005/0197923 | A1* | 9/2005 | Kilner .............. | G06Q 30/0201 382/118 |
| 2008/0201118 | A1* | 8/2008 | Luo .............. | G06F 16/958 703/2 |
| 2010/0063880 | A1* | 3/2010 | Atsmon .............. | G10L 15/1822 705/14.53 |
| 2010/0086215 | A1 | 4/2010 | Bartlett et al. | |
| 2011/0173235 | A1* | 7/2011 | Aman .............. | G06K 9/00342 707/792 |
| 2012/0192227 | A1* | 7/2012 | Fleischman .......... | H04N 21/8126 725/34 |
| 2012/0215903 | A1* | 8/2012 | Fleischman .......... | G06Q 50/01 709/224 |
| 2013/0201330 | A1* | 8/2013 | Thornton .............. | H04N 7/18 348/143 |
| 2014/0161305 | A1* | 6/2014 | Lee .............. | G06F 3/0304 382/103 |
| 2014/0201276 | A1* | 7/2014 | Lymberopoulos ...... | H04L 67/22 709/204 |
| 2014/0324530 | A1* | 10/2014 | Thompson .......... | G06Q 30/0201 705/7.29 |
| 2014/0335480 | A1* | 11/2014 | Asenjo .............. | G06Q 10/06 434/107 |
| 2014/0337089 | A1* | 11/2014 | Tavares .............. | G06Q 20/30 705/7.29 |
| 2014/0375886 | A1* | 12/2014 | Galleguillos ...... | G06K 9/00295 348/571 |
| 2015/0206443 | A1* | 7/2015 | Aylesworth .......... | G06Q 50/20 434/322 |

OTHER PUBLICATIONS

"Second Office Action Issued in Chinese Patent Application No. 201680035310.4", dated Mar. 16, 2020, 13 Pages.

\* cited by examiner

AUTOMATIC RECOGNITION OF ENTITIES IN MEDIA-CAPTURED EVENTS

CROSS REFERENCE TO RELATED APPLICATION

This application is a continuation of application Ser. No. 15/491,614, filed Apr. 19, 2017, now U.S. Pat. No. 10,165,015, issued Dec. 15, 2018, which is a continuation of application Ser. No. 14/741,015, filed Jun. 16, 2015, now U.S. Pat. No. 9,704,020, issued Jul. 11, 2017, which applications are incorporated herein by reference in their entireties.

BACKGROUND

Face recognition is a popular and competitive area of technology. However, the realtime identification of faces of live broadcasts poses an enormous challenge. For such a system to work, a massive support system which has faces of every person (e.g., celebrities, sports stars, etc.) that can possibly appear on television must be created. Yet a system of this scale that is fast and provides high precision is very difficult to achieve. Moreover, taking a considerably smaller subset of people that appear in broadcasts can still result in millions of faces typically seen in broadcasts, but which is a number that cannot be processed in realtime. Furthermore, many celebrity faces look so similar that the required processing for distinguishing such faces in realtime is impractical. The speed at which the results need to be obtained, memory resources required, and low precision are reasons why the realtime identification of faces of live broadcasts at a large scale poses an enormous challenge.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the identification of entities such as people and content (e.g., text, logos, etc.) in live broadcasts (e.g., streaming content (e.g., video) of live events) and non-live presentations (e.g., movies) in realtime using at least recognition processes (e.g., face recognition). The realtime identification can be achieved for television broadcasts of live events as well as television shows and movies, and is sufficiently lightweight (fewer instructions for simpler and faster execution) to be handled by a system with modest resources (e.g., local client devices, portable computing devices, cell phones, etc.).

The disclosed architecture scales to both the live broadcasts and non-live television and computer-based shows and movies to recognize entities in the video frames and supplement the video presentation with information/content from network sources such as restricted (login enabled) and non-restricted information sources (e.g., websites) of the Internet, as well as from personal storage of a user and enterprise information sources.

More specifically, this can be accomplished by extracting live data related to a live event (where live data comprises realtime information generated as the event is occurring and/or in close time proximity to when the event is occurring). With respect to people entities, filtering can be performed to identify the named entities (e.g., people) from the extracted live data, and trending topics discovered as relate to the named entities, as associated with the live event. Multiple images (e.g., photos) of the named entities captured under different conditions (e.g., lighting, one or more suitable poses to enable quality recognition, etc.) can be utilized. The images are then processed to extract and learn facial features (train one or more models), and facial recognition is then performed on faces in the video (e.g., live) using the trained model(s).

The architecture also finds applicability to recognition processing of family members, relatives, and/or friends captured in personal movies/photos during social events such as reunions, gatherings, etc. The identification of such people can be recognized based on personal models trained for such categories of people. For example, it is commonplace for families and the families of relatives to grow in size and be dispersed across geographical locations such that "keeping up" with children and grandchildren can be difficult. The capture of family images of cousins, relatives, etc., and access to such images then enables the recognition of faces and background content for such members while reviewing past events (e.g., reunions) via videos, photos, and so on. The information presented with the video/photo during review can include what the person is doing now, biographical information, etc., received from social networks and other suitable information sources.

For example, the architecture can be implemented as a system, comprising: an access component configured to access information related to an event captured in a video; a collection component configured to collect training data from the information and used for identification of entities in the video; a training component configured to train a model using the training data; a recognition component configured to perform facial recognition processing of the entities in the video to identify a specific entity, the facial recognition processing performed using the model; and, a content component configured to obtain content relevant to the specific entity for presentation with the specific entity.

The architecture can be implemented as a method, comprising: accessing information related to viewing of a video and as relates to an event; collecting training data from the information for identification of an entity in the video; training a model using the training data; performing recognition processing of entities in the video to identify the entity, the recognition processing performed using the model; and presenting content relevant to the entity.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
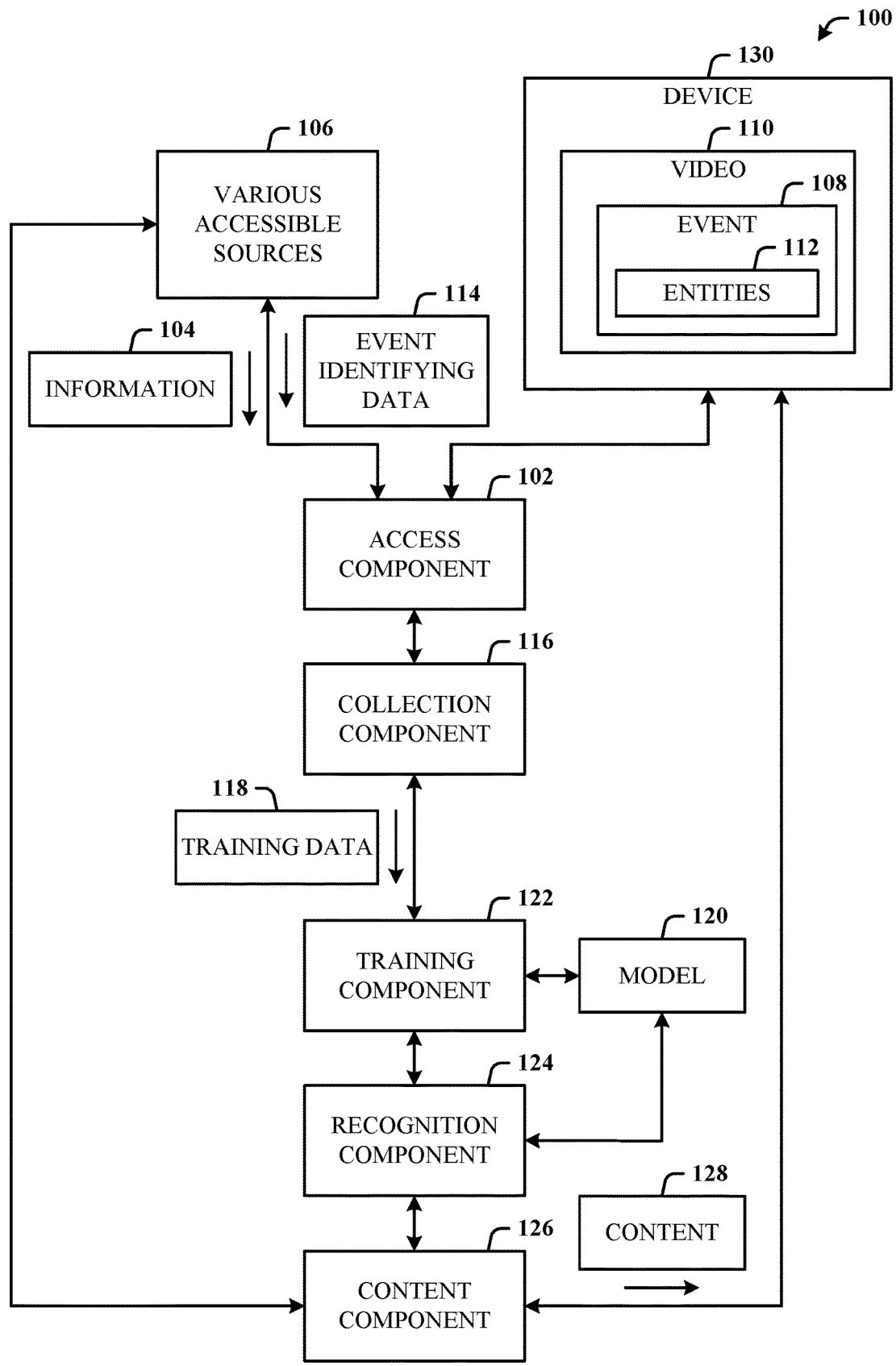
FIG. 1 illustrates a system for the automatic recognition of entities in media-captured events in accordance with the disclosed architecture.

Entity recognition (e.g., face, textual) in live broadcasts is a daunting challenge. With respect to the entities being people, one approach to guarantee precision for a realtime event is to manually tag people (images thereof) scene-by-scene; however, this technique is not scalable to the potential millions of faces of people routinely shown in broadcasts.

The disclosed architecture scales to videos that include both live broadcasts and non-live television shows and movies to recognize entities in realtime in the video frames and supplement the video presentation with content network sources such as restricted and non-restricted information sources of the Internet, as well as from personal storage of a user and enterprise information sources. This can be accomplished by extracting live data related to an event, filtering named entities from the extracted live data, finding the trending topic based on named entity, fetching multiple images under different conditions for each person, extracting and learning facial features from multiple photos fetched, and recognizing faces in the live video on the basis of the trained data.

The architecture enables realtime entity recognition (e.g., faces of people) on-screen during live broadcasted events as well in TV shows and movies in realtime by attaching context obtained from different sources about the event, and retrieving training content (e.g., images for person faces) from a search engine. The different sources can be online, offline, structured, and/or unstructured.

The architecture is now described with respect to the live broadcast of an event. An event is defined as including activities occurring just before and just after the event as well as performance of the event. For example, a sporting event includes activities captured (covered) before the game begins and follow-up ("re-cap") as to post-game interview of players, coaches, playback of specific plays during the event, etc.) after the game is over. Description of a non-live implementation is described hereinafter. With respect to non-live events such as movie re-runs, the event includes activities captured (covered) before the movie begins such as a host person talking briefly about actors in the movie, and awards presented, and follow-up ("re-cap") as to post-movie commentary, etc.) after the movie is over.

The live broadcast process begins with live data (information) extraction from various data sources such as websites, online television program guides, online user messaging traffic, and so on. Data sources that typically accommodate a sufficient amount of user messaging traffic about different topics, such as social media websites, are particularly useful. Accordingly, user messages related to the live event are extracted from the one or more data sources in realtime with the event (while the activities of the event are actually occurring), and within a previously determined time window. The time window computed for any given event can be determined based on the kind of event and duration of the event, for example. Additionally, structured and unstructured search engine results information can also be extracted to determine the people-of-interest likely to be at the event.

After obtaining user messaging content (e.g., text) about the event, the user messaging content is processed through a named entity recognition system that generates a list of named entities and associated popularity, as the names occur in the content, and entity type (e.g., person, organization, location, etc.). When looking for people, named entities that do not refer to people names can be filtered out.

Using the above set of named entities, the architecture then finds the named entities that are trending (e.g., in social media networks) at the moment the event is occurring. The trending information provides context surrounding the live content of the video and further enables the generation of a ranked list of the people entities. The trending and ranked list generation process can be performed at regular time intervals to identify changes in trending topics related to the live event.

Model training comprises the use of a search engine to query for images of each person in the ranked list of named people entities. Fetching the multiple images is part of gathering the training data, and includes images of the people in different lighting conditions and from different angles, as well as other poses that could enhance the quality of the training data. Quality enhancement can also comprise removing images that include more than one face (e.g., group photos) and images with no people faces, leaving the labeled set of final images as the training data. The labeled set of photographs for each person (e.g., celebrity, public figure, etc.) is then processed as training data through a face recognition system to create a model of extracted and learned facial features from the images.

The individual frames of the live broadcasted event (e.g., on television) are input to the face recognition system. When the face recognizer produces an output from the list of people with which the recognizer was trained, and with a confidence level higher than a predetermined threshold, the frame that includes the image is tagged with the person's name.

The architecture is lightweight in that a small number (e.g., twenty) of images per named entity are sufficient to train the face recognition system and identify the corresponding entity with high precision. Since this process utilizes only a few images to be stored in memory, the system can learn and recognize faces quickly without high processor or memory requirements. Additionally, rather than processing every frame, the architecture can process every $n^{th}$ frame (e.g., every 25th frame), since items on screen do not change that frequently (e.g., every few seconds).

For non-live events such as pre-recorded television shows, the architecture operates slightly differently in that the list of people can be gathered from an online knowledge source that lists the on-screen and off-screen names of actors/celebrities. The image search is then performed for both the actor as well as the actor's on-screen name, using query refinements to get images of the actor in the same general makeup as on the show. These images, labeled with indicia such as the actor's name, are then input to the face recognition system for training, as in the live event description described herein. Additionally, user messages previously communicated on social media websites during the premiere of the movie or show episodes can be obtained to find mentioned entities.

As indicated herein, the architecture can be extended to process entities other than human faces. For example, image recognition can be implemented to identify textual information, logo designs, scenery, points of interest, etc., using image recognition algorithms in place of face recognition.

The disclosed architecture exhibits technical effects related to program execution, reduced memory requirements, and improved usability. For example, given the lightweight nature of the architecture, less memory is needed and thus, caching becomes more resource affordable thereby enabling an improved user experience. Additionally, less code to be executed translates into faster code execution and the improved user experience.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 for the automatic recognition of entities in media-captured events in accordance with the disclosed architecture. The system 100 can include an access component 102 configured to access information 104 (from various accessible sources 106) as relates to an event 108 captured/presented in a video 110 and one or more entities 112 (e.g., people, logos, text, audio, other content and media types, etc.) shown in the video 110.

The access component 102 can comprise one or more applications that interface to various accessible sources 106 (e.g., accessible by the public in general, sources that require login credentials, etc.) of information such as social media networks, enterprise networks, publicly-accessible websites, personal networks and storage devices, and so on. The access component 102 is capable of identifying the particular event 108 occurring in realtime or soon to occur, and then extracting the information 104 relevant to the event 108 (e.g., live broadcast event), movies, show re-runs, and/or other types of presentation media.

The access component 102 can further be configured to access event identifying data 114 from the various accessible sources 106 such as event program sources that include, but are not limited to, media communications sources (e.g., television, radio, web-based program sources, program guides, websites, etc.) that are readily available, and that typically provide such event identifying data 114. The event identifying data 114 enables the access component 102 to obtain the relevant information 104 for the event 108 and any of the entities 112 associated with the event 108.

For example, the event identifying data 114 of a sporting event can be obtained from the various accessible sources 106 that comprise television programming sources which indicate when the sporting event will take place, the location of the event, and possible entities such as sportscasters and team members of the teams participating in the sporting event. Thus, given this event identifying data 114, it can be inferred that certain entities such as people, will be present in the video 110, and it also can be inferred that specific pieces of content such as player statistics, biographies, etc., related to these people would be desirable for viewing in combination with the event 108.

A collection component 116 can be provided and configured to derive and output training data 118 from the information 104, and use the training data 118 ultimately for identification of entities 112 in the video 110 via a trained model 120. Accordingly, a training component 122 can be provided and configured to train the model 120 using the training data 118. The training component 122 can be configured to train the model 120 using a set of tagged (labeled) images of the entities 122 to learn facial features of the entities 122. In other words, where the event is known, it can also be known with high probability the identity of the people who will likely be part of the event. Thus, given this information, images of the people likely to be at or part of the event can be obtained and tagged for training the model 120.

A recognition component 124 can be provided and configured to perform recognition processing (e.g., facial) of the entities 112 in the video 110 to, for example, identify a specific entity (e.g., person) or multiple entities (e.g., sportscaster(s), players, coaches, etc.) where the recognition processing is performed using the trained model 120.

A content component 126 can be provided and configured to obtain content 128 relevant to the specific entity for presentation with the specific entity and/or video 110. Once recognition processing is completed for given entities, the entities are then known, and the content component 126 can then search and retrieve content 128 relevant to the entity, event, etc., from the various accessible sources 106, and facilitate presentation of the relevant content 128 on the device 130 presenting the video 110, or other device(s) that may or may not be presenting (playing) the video 110.

As previously indicated, the event 108 can be a live broadcast event captured via the video 110 and the video 110 is streamed (via the web to a computing device and/or television) for viewing on first device (e.g., the device 130) while the event 108 is occurring. The relevant content 128 can then be presented on the first device (e.g., the device 130) while the video 110 is being viewed on the first device (device 130).

For example, when using a device such as a desktop computer, the content 120 can be presented in a content window next to the video window in which the video 110 is being presented. When using a smart television, similar side-by-side presentation of the video 110 and content 120 can be achieved.

In these scenarios, the content 120 can be configured to change dynamically based on the entity being viewed in the video 110. For example, if the quarterback of a football team in a football event (being broadcast live) is the focus of the video, content relevant to the quarterback can be presented next to the video view in which the quarterback is shown as the predominant entity in the frames of the video. When the video then transitions from the quarterback back to the overall team play, the content 120 can be automatically changed to then show content relevant to the teams, such as division standing(s), game statistics, etc. Thus, the system 100 operates in realtime to provide content in realtime based on specific scenes and entities shown in the video 110.

The disclosed architecture is suitably robust and capable to enable the video to be shown on a first device and the content on another device. Thus, where the event is a live event captured via the video and the video is streamed for viewing on a first device while the event is occurring, the relevant content can be presented on one or more other devices while the video is being viewed on the first device. In this scenario, a user can be watching the event on the television, while the relevant content is presented on a tablet computing device being held by the user.

The access component 102 can be configured to access the information 104 according to a predetermined time window, where the time window can be determined based on at least one of, kind of the event or duration of the event. In other words, the information 104 will likely be of the desired quality and quantity just prior (e.g., a few hours) to the event occurring rather than days or even weeks before the event. For example, where the various accessible sources 106 include social media, where user interest (user messages) in various events tends to trend with interest at certain times, usually of greater interest just prior to the event 108 occurring, and just after the occurrence of the event 108, with less interest at a time (e.g., weeks, months) well before and well after the event occurrence.

Figure 2:
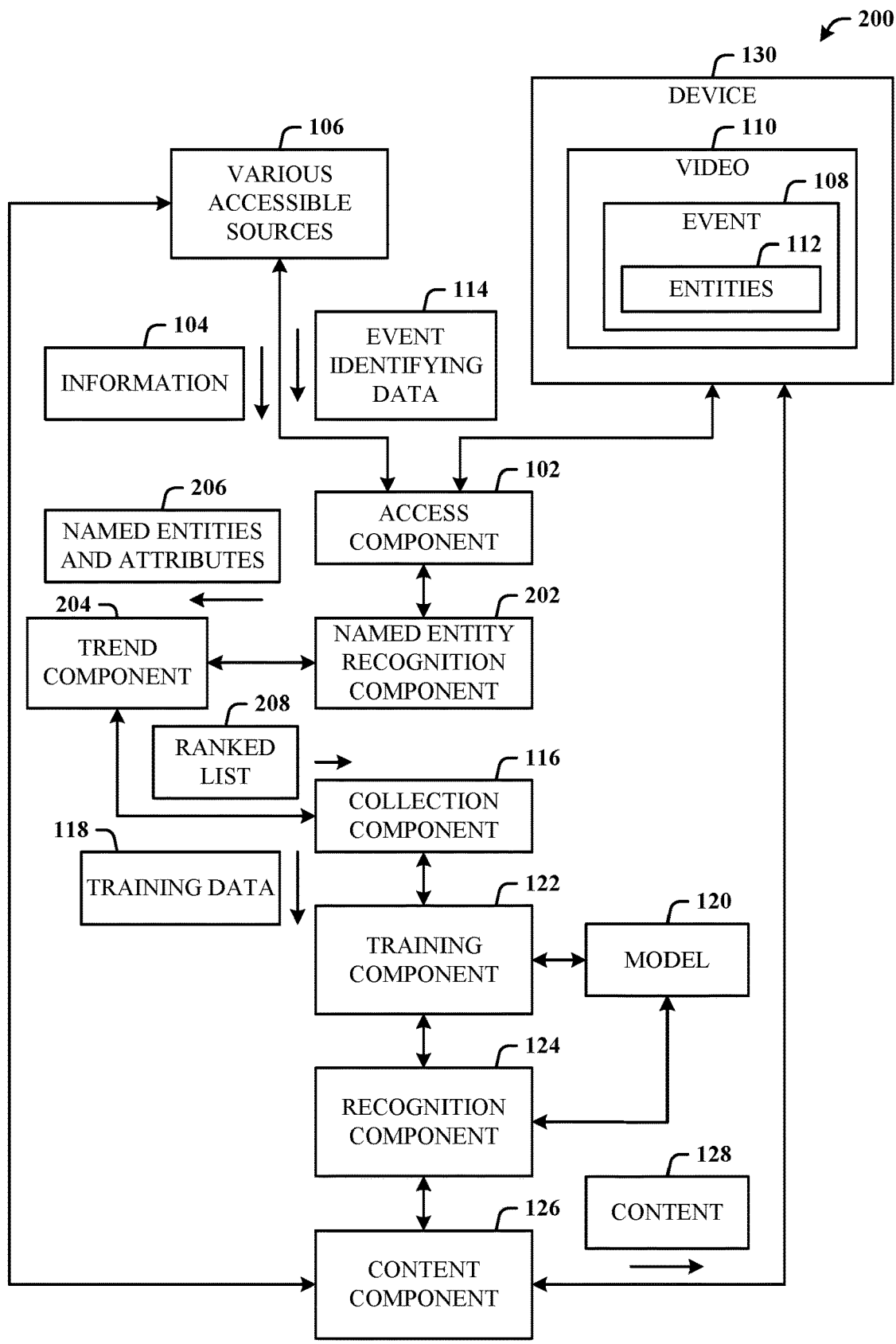
FIG. 2 illustrates an alternative system for the automatic recognition of entities in media-captured events in accordance with the disclosed architecture.

FIG. 2 illustrates an alternative system 200 for the automatic recognition of entities in media-captured events in accordance with the disclosed architecture. The system 200 comprises the components and capabilities of the system 100 of FIG. 1, as well as additional components, such as a named entity recognition component 202 and a trend component 204. The named entity recognition component 202 can be provided and configured to process social media messages, and output one or more of named entities, entity popularity parameters, and entity type information. The trend component 204 is provided and configured to access trend information that indicates entities that are trending in correlation to the event, and from which context of the event is inferred.

In operation, the access component 102 accesses the information 104 (from the various accessible sources 106) as relates to the event 108 captured/presented in the video 110 and one or more entities 112 (e.g., people, logos, text, audio, other content and media types, etc.) shown in the video 110.

The access component 102 can comprise one or more applications that interface to the various accessible sources 106. The access component 102 identifies the particular event 108 occurring in realtime (e.g., broadcast live event, movie, etc.) or soon to occur, and then extracts the information 104 relevant to the event 108 (e.g., live broadcast event), movies, show re-runs, and/or other types of presentation media.

In the context of a broadcast live event, when the live event is being screened on television channels (e.g., the Oscars), live information related to the event is extracted. The sources for this information can be social media sites that provide a suitable amount of user message traffic (e.g., Twitter™). In operation, during the event, user messages related to the Oscars are extracted in realtime from the corresponding social media website, within a previously determined time window. The time window can be made to depend on the kind of event and the event duration. Additionally, structured and unstructured data can be extracted from knowledge graphs, websites that maintain updated data stores of movies, television, and celebrity content, etc., to determine the people who are expected for this event. In another example, if the event is a live sports event, websites that typically store and update sports-related information such as player and team statistics, player names, etc., can be accessed.

The access component 102 can further be configured to access the event identifying data 114 from the various accessible sources 106 such as event program sources that include, but are not limited to, media communications sources (e.g., television, radio, web-based program sources, program guides, websites, etc.) that are readily available, and that typically provide such event identifying data 114. The event identifying data 114 enables the access component 102 to obtain the relevant information 104 for the event 108 and any of the entities 112 associated with the event 108.

After obtaining all the content (e.g., text) from user messages about the event, this user content is processed by named entity recognition component 202. The output of the named entity recognition component 202 is a list of named entities and attributes 206, where the associated attributes can include, but are not limited to, entity popularity as the entity name occurs in the content (e.g., text) and entity type (e.g., Person name, Organization name, and/or Location name). Named entities that do not refer to people names can be filtered out. Put another way, the named entity recognition component 202 processes social media messages, and outputs one or more of named entities, entity popularity parameters, and entity type information.

For the above set of named entities (and attributes) 206, the trend component 204 finds the named entities trending at the current time in social media networks. This provides information about the context for the live content of the video, and produces a ranked list 208 of entities. This step can be performed at regular intervals to keep up with changes in trending topics. Put another way, the trend component 204 is provided and configured to access trend information that indicates entities that are trending in correlation to the event, and from which context of the event is inferred.

From the top set of named people (the named entities and attributes 206) obtained, a search engine (of the various accessible sources 106) can be queried by the collection component 114 to retrieve images for each person. Fetching multiple images (e.g., twenty, thirty, etc.) assists in gathering the training data 118 with the images (facial poses) in different lighting conditions and from different angles. Each image (e.g., photograph) can be processed through a face detection system to filter out images showing more than one face. This removes images such as group photos, which could eventually be problematic in computing specific faces from which to learn features and characteristics. Filtering can also be performed to remove images where no faces are detected.

The remaining processes are essentially the same as in the system 100 of FIG. 1 where, with respect to training the recognition component 124, the collection component 116 derives and outputs the training data 118 from the information 104 to train the model 120 using the set of tagged (labeled) images of the entities 122 to learn facial features of the entities 122. The recognition component 124 performs recognition processing (e.g., facial) of the entities 112 to identify a specific entity (e.g., person) or multiple entities (e.g., sportscaster(s), players, coaches, etc.), using the trained model 120.

The content component 126 obtains the content 128 relevant to the specific entity for presentation with the specific entity and/or video 110, the content 128 searched and retrieved from the various accessible sources 106. The relevant content 128 can then be presented on the device 130 that presents the video 110, or other device(s) that may or may not be presenting (playing) the video 110.

As before, the content 120 can be changed dynamically based on the entity being viewed in the video 110. Thus, the system 200 operates in realtime to provide content in realtime based on specific scenes and entities shown in the video 110.

In accordance with the system 100 of FIG. 1, the disclosed architecture is suitably robust and capable to enable the video to be shown on a first device and the content on another device. Thus, where the event is a live event captured via the video and the video is streamed for viewing on a first device while the event is occurring, the relevant content can be presented on one or more other devices while the video is being viewed on the first device. In this scenario, a user can be watching the event on the television, while the relevant content is presented on a tablet computing device being held by the user.

Additionally, the access component 102 can be configured to access the information 104 according to a predetermined time window, where the time window can be determined based on at least one of, kind of the event or duration of the event.

It is to be understood that in the disclosed architecture, certain components may be reoriented, combined, omitted, and additional components may be included. For example, due to the lightweight nature of the architecture, all components in the system 100 of FIG. 1, except the sources 106, can be implemented in a local device (e.g., a laptop). Similarly, all components in the system 200 of FIG. 2, except the sources 106, can be implemented in a local device (e.g., a laptop). Thus, caching in memory can be realized for fast execution of recognition processing and content presentation.

Figure 3:
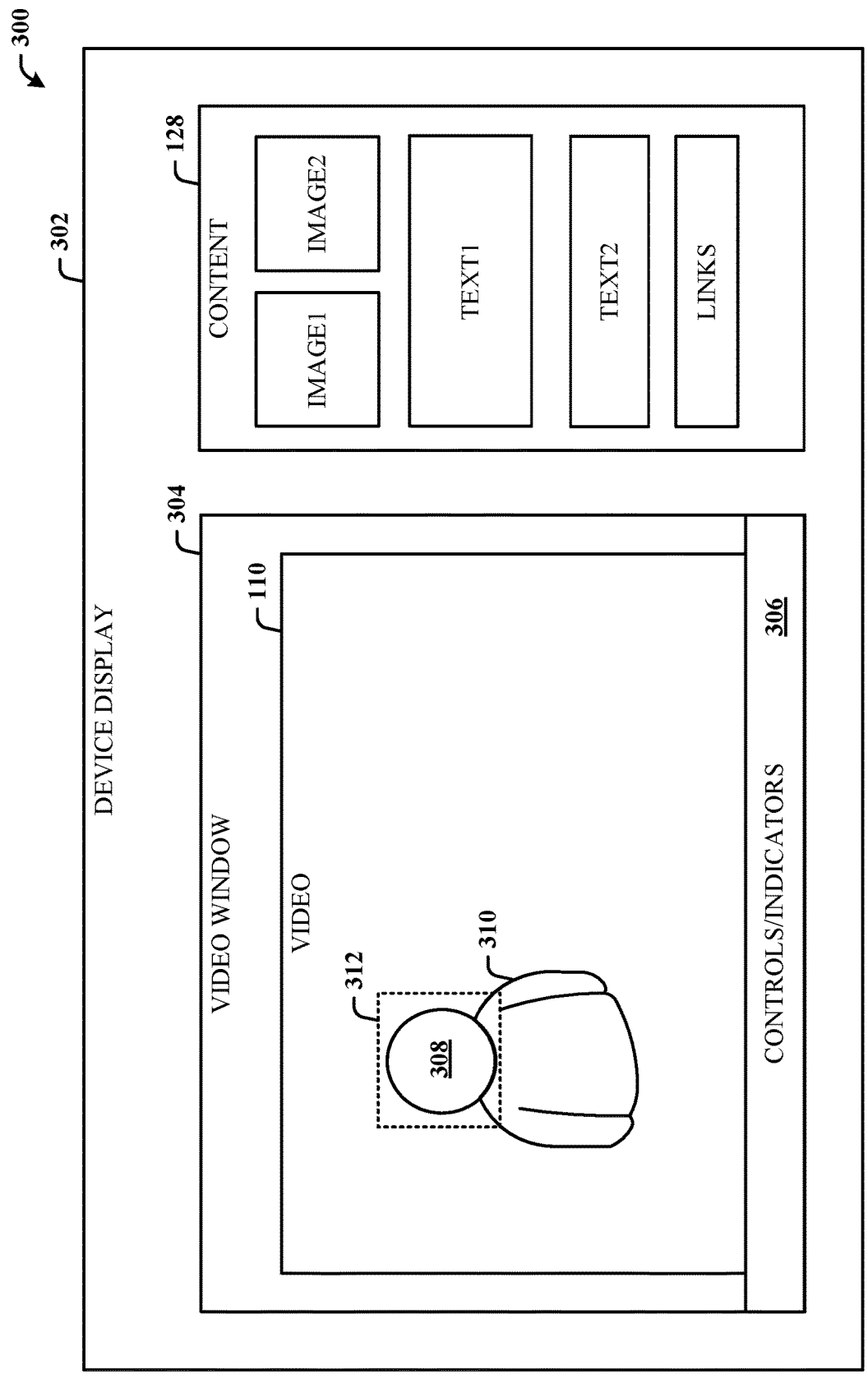
FIG. 3 illustrates a view that shows presentation of the video and relevant content in a device display.

FIG. 3 illustrates a view 300 that shows presentation of the video 110 and relevant content 128 in a device display 302. A video window 304 is shown in which the video 110 (e.g., movie, live broadcast, television program, etc.) is presented. The video window 304 can include various controls and indicators 306 such as forward, pause, fast forward, reverse, fast reverse, speaker volume control, and so on, commonly associated with user controls in viewing a movie.

Face recognition processing identifies the face 308 of a person 310 in the video 110 (as indicated in a recognition bounding box 312, which may or may not be visible to the user while viewing the video 110). Once the person 310 is identified, a query can be composed and processed by a search engine for the relevant content 128. The relevant content 128 returned from the search can comprise any variety of media types, such as text (Text1 and Text2), images (Image1 and Image2) of the person 310, links (Links) that enable navigation by the user to websites or other content sources. The content 128 can be presented in a scrollable content window to enable review of content above or below the currently viewed content.

As indicated herein, image recognition on one or more frames of the video can be employed for logo identification, and which if used in combination with face recognition of a person in the same image, results in the content 128 comprising both content about the person 310 and content associated with the logo (not shown).

Figure 4:
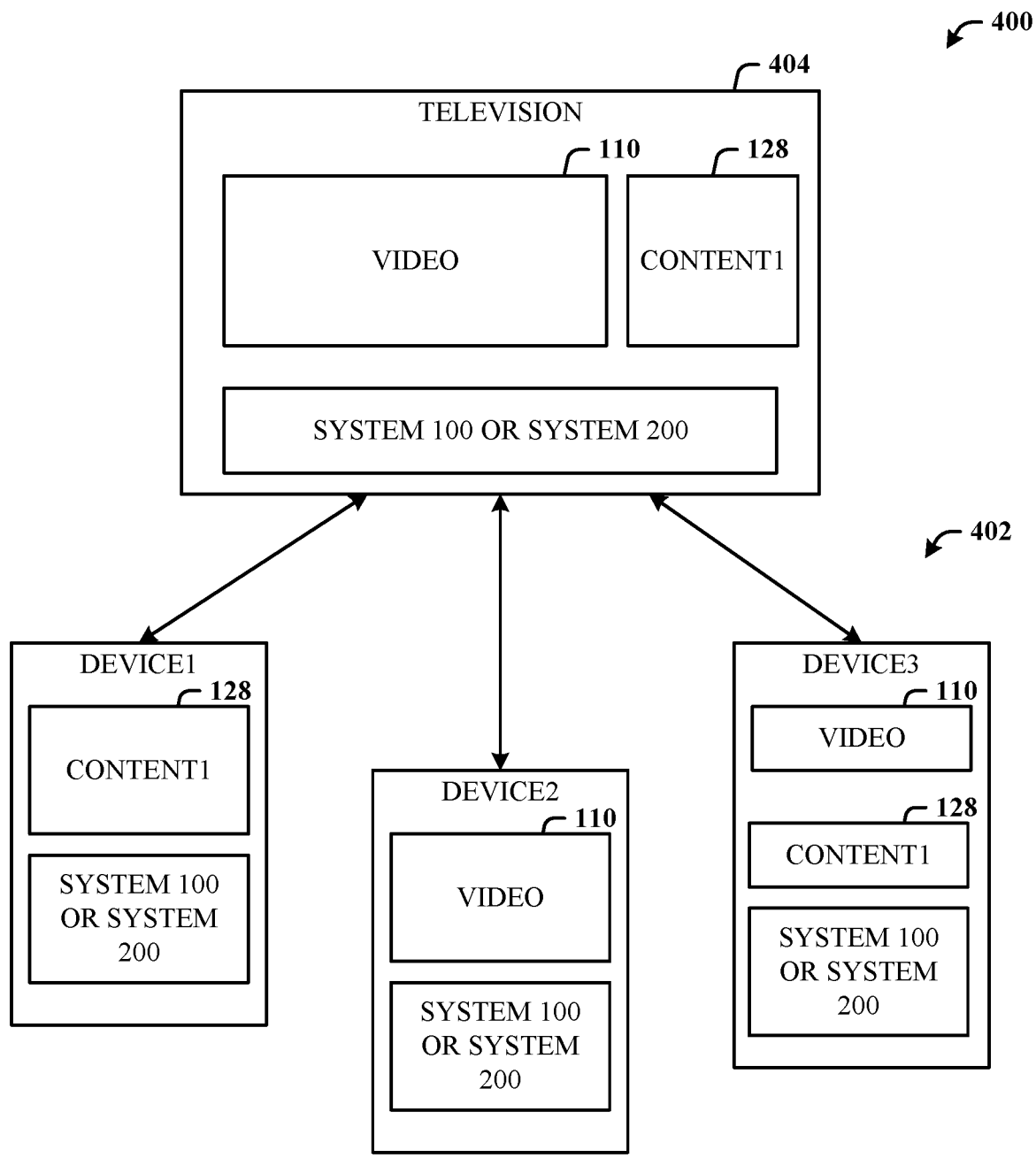
FIG. 4 illustrates a system of entity recognition and content distribution among multiple client devices.

FIG. 4 illustrates a system 400 of entity recognition and content distribution among multiple client personal devices 402. Here, three client personal devices (Device1, Device2, and Device3) such as tablet computers, laptop computers, desktop computers, smart phones, and the like, are being used by users in combination with watching the video 110 of a live broadcast on a television 404. Any of the personal devices 402 and the television 404 can be implemented with system 100 or system 200, and the associated methodologies as described herein.

Thus, in one illustrative operation, the television 404 performs face recognition in the video 110 of the live broadcast and content presentation of the relevant content 128. The users of the person devices 402 can choose to view only the content 128 (as in Device1), only the video 110 (as in Device2), or both the video 110 and the content 128 (as in Device 3).

In a second illustrative operation for devices without the capability of the disclosed architecture, Device1 operates to perform face recognition of the live broadcast video 110 presented by the television 404, and then communicates (serves) the content 128 to the television 404 while also presenting the content 128 on the Device1. Device2 and Device3 can then receive the video 110, the content 128, or different items of the content 128, as can be user selected, for example.

In yet another illustrative operation, the model created by Device1 can then be shared to the other devices, Device2 and Device3, rather than these devices being required to generate their own models or that lack the capability to generate models.

It can also be the case the one or more models can be generated before the event based on prior similar events and served (downloaded) to client devices. For example, while sporting events may change location for week to week, the faces associated with teams, sportscaster, etc., are relatively stable and remain essentially the same. Thus, models can be generated for specific teams, and then combined when the two teams compete for rapid live recognition on client devices.

Where the various accessible sources 106 may include personal storage devices and content and/or social media content the user wishes not to be used, the disclosed architecture can optionally include a privacy component that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
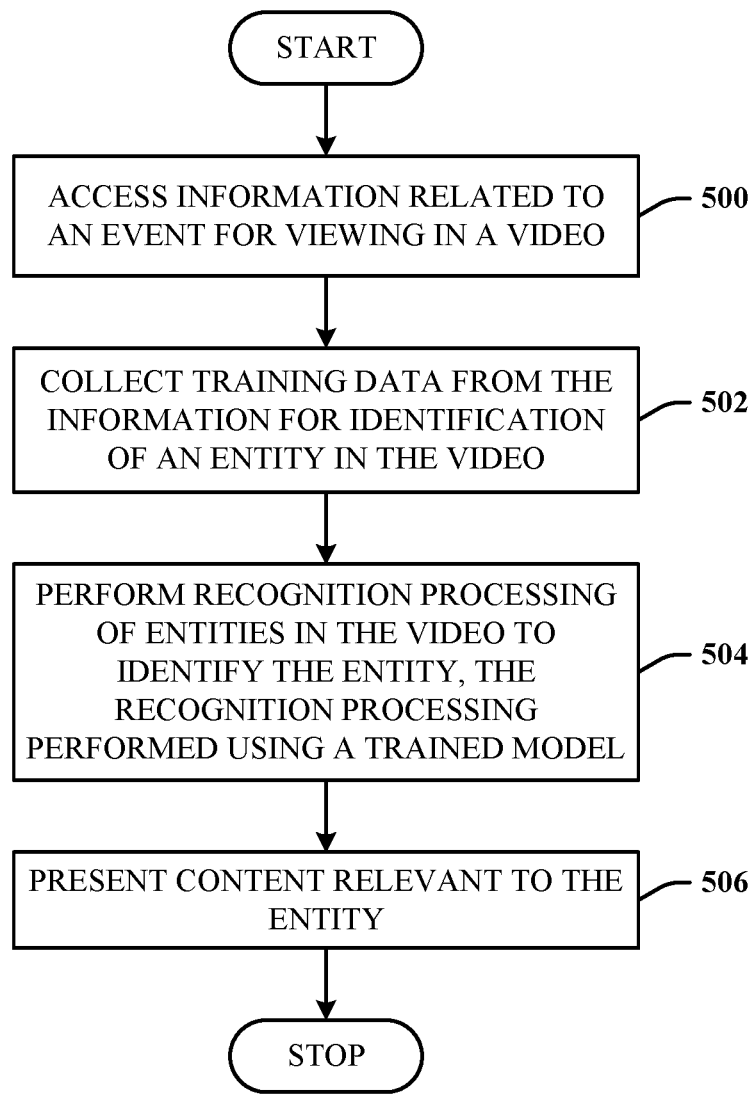
FIG. 5 illustrates a method in accordance with the disclosed architecture.

FIG. 5 illustrates a method in accordance with the disclosed architecture. At 500, information related to an event for viewing in a video is accessed. At 502, training data is collected from the information for identification of an entity in the video. At 504, recognition processing of entities in the video is performed to identify the entity. The recognition processing is performed using a trained model. At 506, content relevant to the entity is presented.

The method can further comprise presenting the relevant content while the video is being viewed. The method can further comprise presenting the relevant content on a device from which the video is being viewed or on a device different than the device from which the video is being viewed. The method can further comprise accessing the information, collecting the training data, performing the recognition processing, and presenting the content while the video is being viewed. The method can further comprise accessing the information, collecting the training data, performing the recognition processing, and presenting the content while the video captures a live event.

The method can further comprise accessing the information from social media networks and according to a predetermined time window relative to the event. The method can further comprise performing name recognition processing to identify names in the information as obtained from social media. The method can further comprise accessing trending information as to named entities to infer context of the event. The method can further comprise presenting relevant content in association with recognized faces of the entities.

Figure 6:
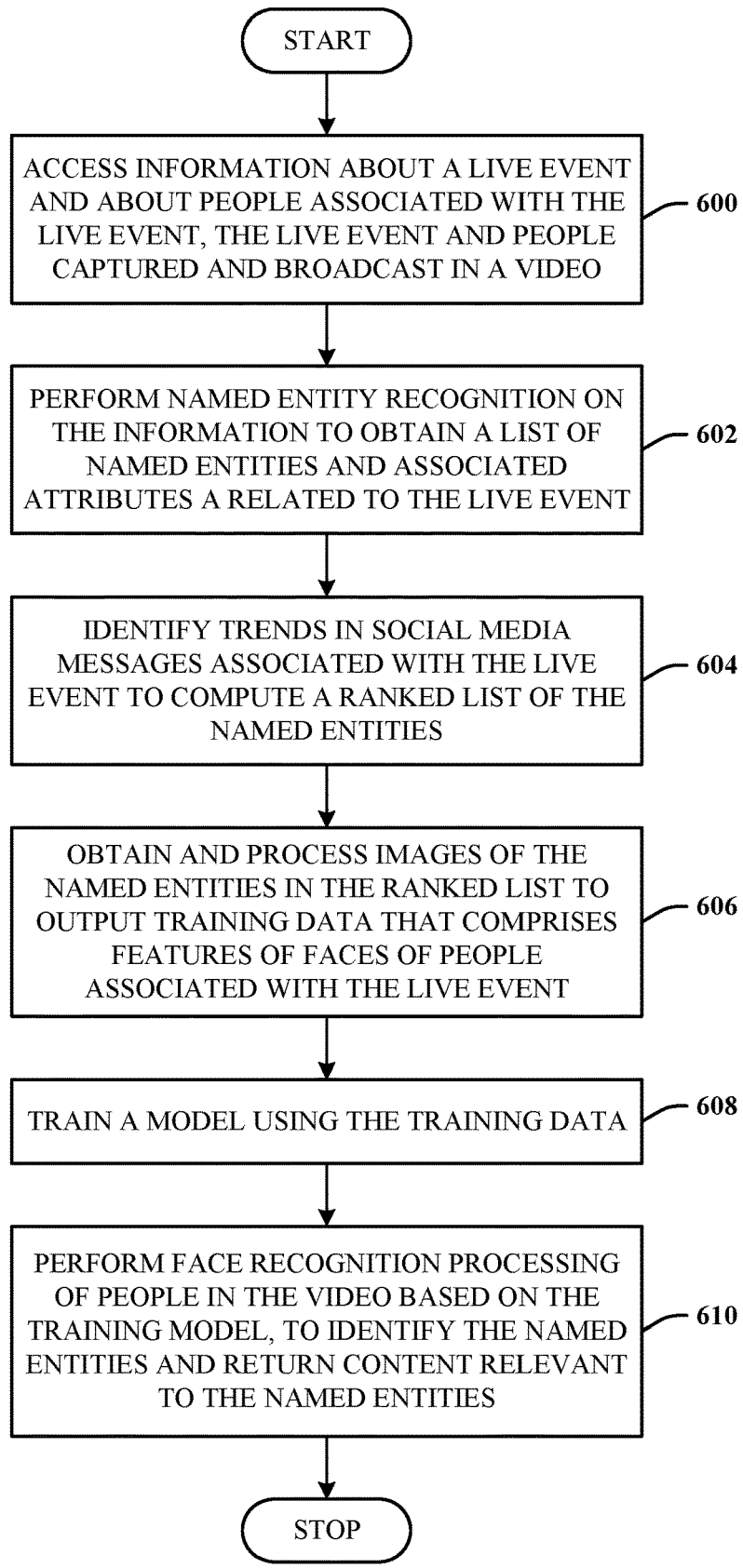
FIG. 6 illustrates an alternative method in accordance with the disclosed architecture.

FIG. 6 illustrates an alternative method in accordance with the disclosed architecture. At 600, information about a live event and about people associated with the live event is accessed. The live event and people are captured and broadcast in a video. At 602, named entity recognition is performed on the information to obtain a list of named entities and associated attributes a related to the live event. At 604, trends in social media messages associated with the live event are identified to compute a ranked list of the named entities. At 606, images of the named entities in the ranked list are obtained and processed to output training data that comprises features of faces of people associated with the live event. At 608, a model is trained using the training data. At 610, face recognition processing of people in the video is performed based on the training model, to identify the named entities and return content relevant to the named entities.

The method can further comprise accessing of the information, performing the named entity recognition, identifying the trends, obtaining and processing the images, training of the model, performing the face recognition processing, and presenting the relevant content while the live event is occurring. The method can further comprise presenting the relevant content on a device from which the video is being viewed or on a device different than the device from which the video is being viewed. The method can further comprise presenting the relevant content in association with a named entity when the named entity is shown in the video.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
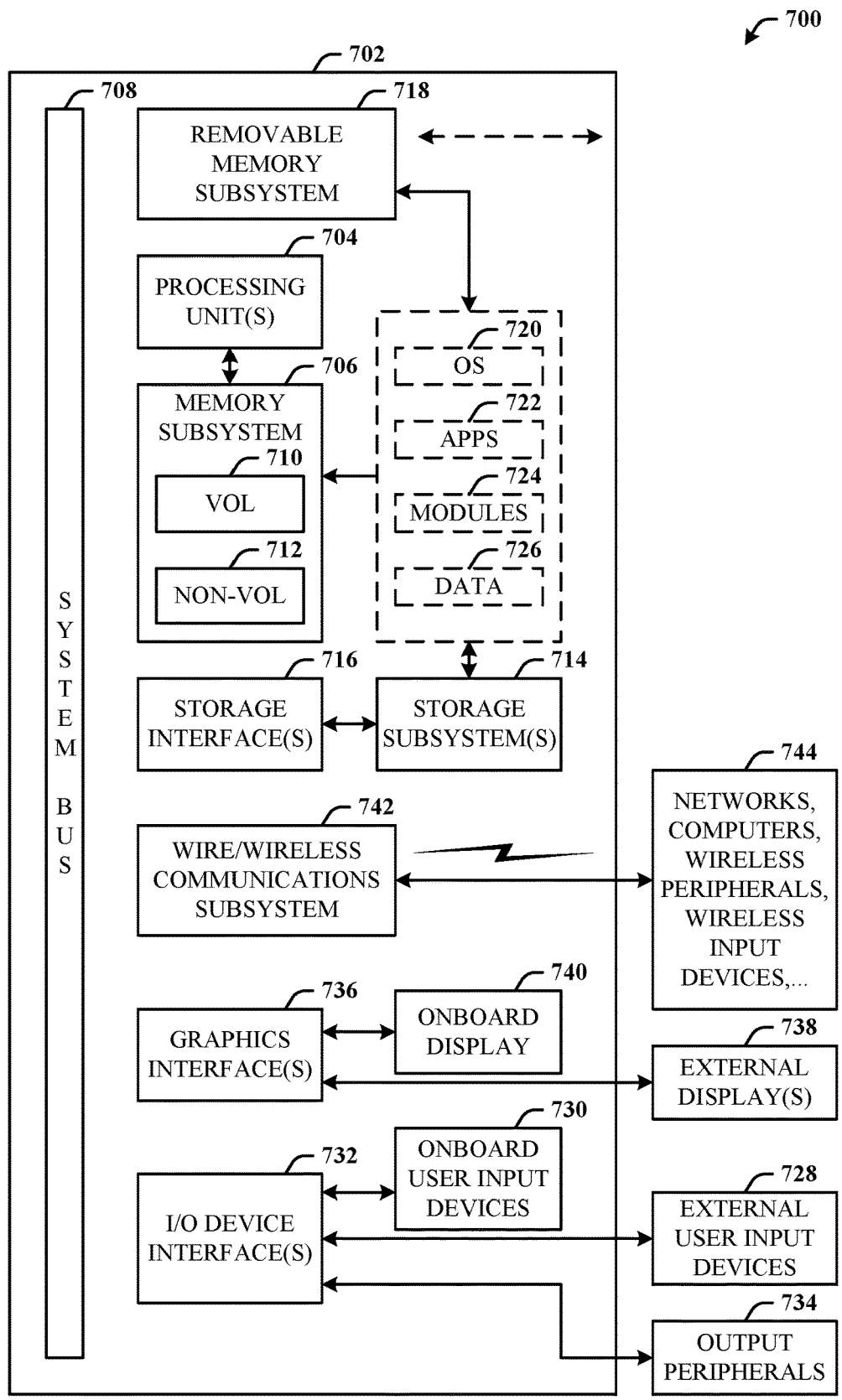
FIG. 7 illustrates a block diagram of a computing system that executes the automatic recognition of entities in media-captured events in accordance with the disclosed architecture.

Referring now to FIG. 7, there is illustrated a block diagram of a computing system 700 that executes the automatic recognition of entities in media-captured events in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium (where the medium is any physical device or material on which data can be electronically and/or optically stored and retrieved) such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, items and components of the system 200 of FIG. 2, items and components of the view 300 of FIG. 3, items and components of the system 400 of FIG. 4, and the methods represented by the flowcharts of FIGS. 5 and 6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, a touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The architecture can be implemented as a system, comprising: means for accessing information related to viewing of a video and as relates to an event; means for collecting training data from the information for identification of an entity in the video; means for training a model using the training data; means for performing recognition processing of entities in the video to identify the entity, the recognition processing performed using the model; and means for presenting content relevant to the entity.

The architecture can be implemented as an alternative system, comprising: means for accessing information about a live event and about people associated with the live event, the live event and people captured and broadcast in a video; means for performing named entity recognition on the information to obtain a list of named entities and associated attributes a related to the live event; means for identifying trends in social media messages associated with the live event to compute a ranked list of the named entities; means for obtaining and processing images of the named entities in the ranked list to output training data that comprises features of faces of people associated with the live event; means for training a model using the training data; and means for performing face recognition processing of people in the video based on the training model, to identify the named entities and return content relevant to the named entities.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
accessing information related to an event that is to be presented in a video, wherein the information is obtained within a predetermined time window relative to the event;
identifying one or more entities likely to be presented in the video to produce one or more identified entities;
ranking the one or more identified entities based on at least one trend identified in the information to produce one or more ranked entities, the at least one trend indicating which of the one or more identified entities are trending in correlation to the event;
performing recognition processing during a presentation of the video to identify at least one ranked entity in the video;
performing a search to retrieve content relevant to the at least one ranked entity identified by the recognition processing; and
presenting, in real-time during the presentation of the video, the content relevant to the at least one ranked entity.

2. The method of claim 1, wherein the event is a live event captured via the video.

3. The method of claim 1, wherein the presentation presents the content on a device from which the video is being presented or on a device different than the device from which the video is being presented.

4. The method of claim 1, wherein the one or more entities includes at least one person, and wherein performing recognition processing comprises performing facial recognition of one or more persons in the video using a trained recognition model.

5. The method of claim 1, wherein the accessing of the information, the performing of the recognition processing, and the presentation of the content are performed while the video captures a live version of event.

6. The method of claim 1, wherein the accessing of the information accesses the information from social media networks.

7. The method of claim 1, wherein the information comprises trending information.

8. The method of claim 1, wherein each entity in the one or more entities is at least one of an organization, a person, or a location.

9. The method of claim 7, wherein the trending information is accessed to infer context of the event.

10. The method of claim 1, wherein the presentation presents the content in association with recognized entities.

11. A computer-readable storage media device storing computer-executable instructions which, when executed by a hardware processor, cause the hardware processor to perform a method comprising:
accessing information related to an event that is to be presented in a video, wherein the information is obtained within a predetermined time window relative to the event, the predetermined time window determined based on at least one of a type of event or a duration of the event;
identifying one or more entities likely to be presented in the video to produce one or more identified entities;
ranking the one or more identified entities based on at least one trend identified in the information to produce one or more ranked entities, the at least one trend indicating which of the one or more identified entities are trending in correlation to the event;

performing recognition processing during a presentation of the video to identify at least one of the one or more ranked entities in the video;

performing a search to retrieve content relevant to the at least one ranked entity identified by the recognition processing; and presenting, in real-time during the presentation of the video, the content relevant to the at least one ranked entity.

12. The computer-readable storage media of claim 11, wherein the presentation presents the content on a device from which the video is being presented or on a device different than the device from which the video is being presented.

13. The computer-readable storage media of claim 11, wherein the at least one ranked entity comprises an organization, a person, or a location.

14. The computer-readable storage media of claim 11, wherein the information comprises information from social media networks.

15. A system comprising:
a memory storing a program having instructions; and
at least one processor arranged to execute the instructions to perform a method comprising:
accessing information related to an event that is to be presented in a video, wherein the information is obtained within a predetermined time window relative to the event;
identifying one or more entities likely to be presented in the video to produce one or more identified entities;
ranking the one or more identified entities based on at least one trend identified in the information to produce one or more ranked entities, the at least one trend indicating which of the one or more identified entities are trending in correlation to the event;
performing recognition processing during a presentation of the video to identify at least one of the one or more ranked entities in the video;
performing a search to retrieve content relevant to the at least one ranked entity identified by the recognition processing; and
presenting, in real-time during the presentation of the video, the content relevant to the at least one ranked entity.

16. The system of claim 15, wherein the content is presented on a device from which the video is being presented or on a device different than the device from which the video is being presented.

17. The system of claim 15, wherein each entity in the one or more entities comprises an organization, a person, or a location.

18. The method of claim 1, further comprising:
prior to the presentation of the video and based on the information, collecting training data for identification of at least one entity in the one or more entities likely to be presented in the video, the training data comprising image data of the at least one entity; and
training a model using the training data, to learn features of the at least one entity.

19. The computer-readable storage device of claim 11, wherein the computer-readable storage device stores further computer-executable instructions for:
prior to the presentation of the video and based on the information, collecting training data for identification of at least one entity in the one or more entities likely to be presented in the video, the training data comprising image data of the at least one entity; and
training a model using the training data, to learn features of the at least one entity.

20. The system of claim 15, wherein the memory stores further instructions for:
prior to the presentation of the video and based on the information, collecting training data for identification of at least one entity in the one or more entities likely to be presented in the video, the training data comprising image data of the at least one entity; and
training a model using the training data, to learn features of the at least one entity.

* * * * *